May 24, 1932.  G. J. GLAUS  1,859,388
WEATHER STOP FOR CAB WINDOWS
Filed May 5, 1930  2 Sheets-Sheet 1

Fig. 1.

Fig. 2.

Inventor
G. J. Glaus

By Clarence A. O'Brien
Attorney

May 24, 1932.  G. J. GLAUS  1,859,388
WEATHER STOP FOR CAB WINDOWS
Filed May 5, 1930  2 Sheets-Sheet 2
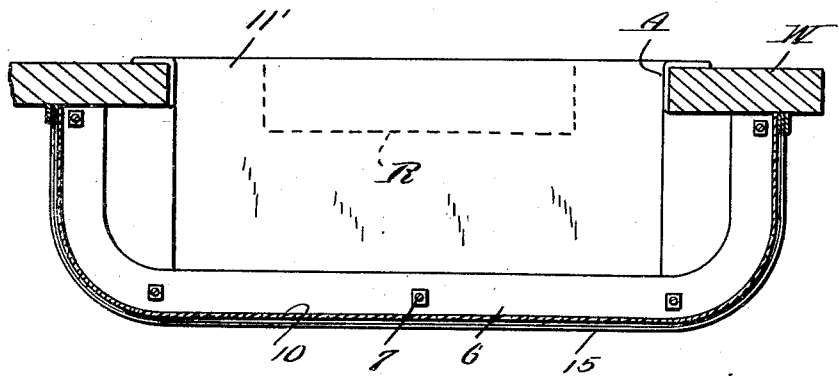
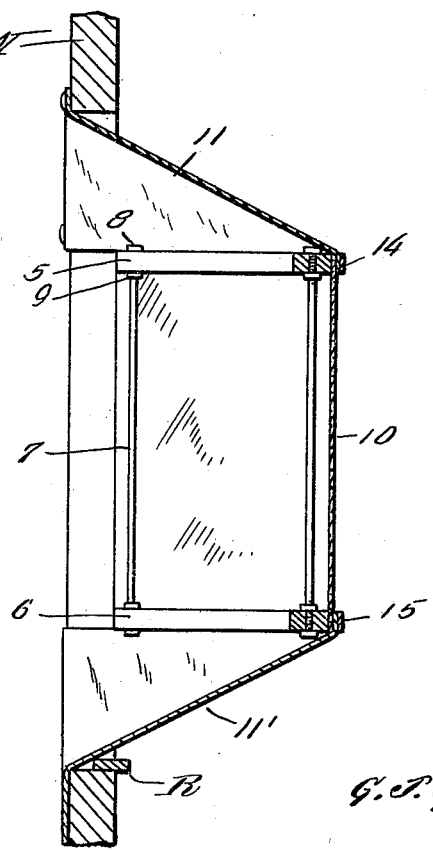
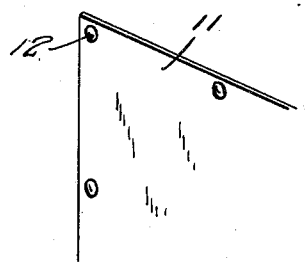
Inventor
G. J. Glaus
By Clarence A. O'Brien
Attorney Patented May 24, 1932

1,859,388

UNITED STATES PATENT OFFICE

GROVER J. GLAUS, OF CHARLESTON, SOUTH CAROLINA

WEATHER STOP FOR CAB WINDOWS

Application filed May 5, 1930. Serial No. 450,034.

This invention relates to a device, which for the sake of convenience may be termed a weather stop, and is adapted for use in conjunction with the window of a locomotive cab.

A primary object of this invention is to provide a device which may be disposed across one of the windows of a locomotive cab whereby the window of the cab may be opened, the device functioning to protect the occupant of the locomotive cab against the elements, in inclement weather, and further against the flying sparks.

Primarily, my invention is adapted to be used with that window of the cab which has no sliding or hinge pane for closing the window.

A still further object of the invention is to provide a device of the above mentioned character which is comparatively simple in construction, can be readily and easily secured to the wall of the cab across the open window, is inexpensive, practical, strong, durable and otherwise well adapted for the purpose designed.

Other objects and advantages of the invention will become apparent during a study of the following description, taken in connection with the accompanying drawings wherein:

Figure 1 is a fragmentary side elevation of a locomotive cab having my invention applied thereto, Figure 2 is a fragmentary detail view viewing the invention from the interior of the cab, Figure 3 is a horizontal transverse sectional view taken through the device, Figure 4 is a vertical transverse sectional view therethrough, Figure 5 is a fragmentary perspective view of one of the curtain members forming part of the invention.

With reference more in detail to the drawings, it will be seen that my improved device is somewhat in the nature of a frame structure comprising upper and lower substantially U-shaped frame members 5 and 6 respectively. The members 5 and 6 are secured together in spaced relation through the medium of vertical tie rods for bolts 7 having the upper and lower ends thereof passing through the respective members. At said upper and lower ends, the tie bolts 7 are secured to the members through the medium of upper and lower securing means 8 and 9 respectively threaded on said end of the tie bolt. Extending between the upper and lower members 5 and 6 for the full length of the members is a transparent panel 10 preferably of celluloid although any other suitable transparent material may be utilized for the purpose.

The panel 10 conforms to the shape of the frame members, and in actual practice the end of the frame members and corresponding end of the panel 10 are disposed against the outer wall W of the locomotive cab designated generally by the reference character C to extend transversely of the normally opened window A in the wall of the cab.

The frame structure referred to extends between the top and bottom of the window in spaced relation thereto.

An upper curtain 11 made of canvas or any other suitable material is secured at its lower edge to the upper frame member 5 along the legs and connecting portion of the U-shaped frame member 5 and is extended upwardly and rearwardly through the upper portion of the window. At its inner free edge along the top and sides thereof the curtain 11 may be provided with suitable means for securing said edge of the curtain to the inner wall of the cab along the upper edge and sides of the window A as clearly suggested in Figure 2.

In this connection, it will be seen that I have provided the curtain 11 along the edge just referred to with suitable spaced openings 12 whereby said edge of the curtain may be secured to the inner wall of the cab by suitable fastening elements 13.

In lieu of the openings 12 complemental fastening devices including male and female members or any other suitable retaining elements may be utilized as is apparent. A lower curtain 11′ is secured at its outer edge along the front and sides thereof to the lower frame member 6 and this curtain 11′ extends inwardly and downwardly to be draped over the lower edge of the window A to extend over the arm rest R usually provided. While any suitable means may be employed for securing the upper and lower edges of the panel 10 to the upper and lower frame members 5 and 6 as well as for securing the outer edges of the upper and lower curtains 11 and 11' to the respective frame members, I also provide suitable reinforcing bands 14 and 15 respectively between which and the upper and lower frame members 5 and 6 are secured the said edges of the panel 10 and the upper and lower curtains 11 and 11' respectively as clearly suggested in Figure 4.

From the foregoing, it will be seen that when my improved device is disposed in position with respect to the cab window in the manner above referred to the occupant of the cab will have clear vision through the window but at the same time will be protected against any flying sparks that would ordinarily enter the cab through the window.

Furthermore it is apparent that my device will also act as a shield for preventing rain, snow, sleet or the like also entering through the window. Furthermore the device for so protecting the occupant of the cab permits of the free use of the cab window as though the same were left open or in its usual condition.

Even though I have herein shown and described the preferred embodiment of my invention, it is to be understood that the same is susceptible to changes fully comprehended by the spirit of the invention as hereinafter described, and the scope of the appended claims.

Having thus described my invention, what I claim as new is:

1. In a device of the class described, upper and lower frame members adapted to extend in spaced horizontal relation across the window opening of a locomotive cab, a transparent panel extending between said upper and lower frame members and terminating at its opposite ends on opposite sides of the window opening in abutting relation with the wall of the locomotive cab, a curtain member secured at one edge to the upper frame member, said curtain member extending for the full length of said frame member and having its free marginal edge portion adapted to be secured to the wall of the cab along the upper edge and opposite side edges of the window opening, a lower curtain member secured to and depending from the lower frame member, said lower curtain member adapted to have a portion thereof extend through the lower portion of the window opening interiorly of the cab.

2. In a device of the character described, a frame structure adapted to be extended across a window opening and including a pair of upper and lower substantially U-shaped frame members, a transparent pane carried by said members and extending between said members for the full length of the members to contact the walk of the cab at opposite sides of the window opening, an upper and lower flexible curtain carried by said frame and of a length corresponding to the length of the frame.

In testimony whereof I affix my signature.

GROVER J. GLAUS.